(12) United States Patent
Bauer (10) Patent No.: US 9,126,769 B2
(45) Date of Patent: Sep. 8, 2015

(54) APPARATUS FOR DISTRIBUTING A STREAM OF PRODUCTS

(71) Applicant: Weber Maschinenbau GmbH Breidenbach, Breidenbach (DE)

(72) Inventor: Sigfrid Bauer, Gross Teetzleben (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 114 days.

(21) Appl. No.: 13/920,167

(22) Filed: Jun. 18, 2013

(65) Prior Publication Data

US 2014/0001009 A1    Jan. 2, 2014

(30) Foreign Application Priority Data

Jun. 29, 2012 (DE) .......................... 10 2012 211 240

(51) Int. Cl.
*B65G 47/64* (2006.01)
*B65G 47/71* (2006.01)

(52) U.S. Cl.
CPC ............ *B65G 47/642* (2013.01); *B65G 47/715* (2013.01); *B65G 2201/0202* (2013.01)

(58) Field of Classification Search
CPC .... B65G 47/082; B65G 47/30; B65G 47/641; B65G 47/642; B65G 47/682; B65G 47/71; B65G 47/715; B65G 2201/0202
USPC ........... 198/369.1, 418.5, 431, 432, 434, 436, 198/437, 445, 457.03, 586, 597, 601
See application file for complete search history.

(56) References Cited

U.S. PATENT DOCUMENTS

| 4,684,008 | A | * | 8/1987 | Hayashi et al. | 198/436 |
| 5,209,339 | A | * | 5/1993 | Antonissen | 198/436 |
| 5,421,446 | A | * | 6/1995 | Koch et al. | 198/369.7 |
| 5,984,301 | A | * | 11/1999 | Holbert et al. | 271/227 |
| 6,691,858 | B2 | * | 2/2004 | Weber | 198/456 |
| 7,404,478 | B2 | * | 7/2008 | Weber | 198/457.03 |
| 7,717,251 | B2 | * | 5/2010 | Glas | 198/448 |
| 8,118,155 | B2 | * | 2/2012 | Noda et al. | 198/586 |

(Continued)

FOREIGN PATENT DOCUMENTS

| AT | 41 399 E | 3/1989 |
| DE | 619395 | 10/1935 |

(Continued)

OTHER PUBLICATIONS

Translation of Germany Search Report dated Apr. 19, 2013 relating to German Patent Application No. 10 2012 211 240.5.

(Continued)

*Primary Examiner* — Leslie A Nicholson, III
*Assistant Examiner* — Keith R Campbell
(74) *Attorney, Agent, or Firm* — Gifford, Krass, Sprinkle, Anderson & Citkowski, P.C.

(57) ABSTRACT

An apparatus for distributing a stream of products comprises an ingoing conveyor and an outgoing conveyor which are configured to convey the products along a conveying direction and which are arranged behind one another viewed in the conveying direction. At least two distributor conveyors which are arranged behind one another viewed in the conveying direction between the ingoing conveyor and the outgoing conveyor and which are each configured to convey the products along the conveying direction are displaceable independently of one another transverse to the conveying direction.

34 Claims, 12 Drawing Sheets

(56) References Cited

U.S. PATENT DOCUMENTS

2008/0251353 A1* 10/2008 Glas .............................. 198/436
2012/0180438 A1* 7/2012 Lagares Corominas ........ 53/513

FOREIGN PATENT DOCUMENTS

| DE | 689 07 213 T2 | 9/1993 |
| DE | 196 17 187 A1 | 4/1996 |
| DE | 101 43 506 A1 | 5/2003 |
| DE | 102007017035 | 10/2008 |
| EP | 2 246 161 A1 | 3/2010 |

OTHER PUBLICATIONS

Translation of European Search Report dated Oct. 22, 2013 relating to EP Patent Application No. 1317184.4.

* cited by examiner

APPARATUS FOR DISTRIBUTING A STREAM OF PRODUCTS

CROSS-REFERENCE TO RELATED APPLICATIONS

This application claims priority of German Patent Application DE 102012211240.5 filed Jun. 29, 2012, the contents of which are incorporated herein by reference.

FIELD OF THE INVENTION

The present invention relates to an apparatus for distributing a stream of products, in particular food products.

BACKGROUND OF THE INVENTION

With modern high-performance slicers, it is possible to cut off individual product slices from a product bar or product loaf, e.g. from a loaf of sausage or cheese, at a high cutting speed. Equally, cut-off product slices as well as product portions comprising a plurality of e.g. stacked or overlapping product slices can be transported away from the slicer relatively fast by means of conveying devices such as band conveyors or belt conveyors and can be supplied to a packaging machine, for example. It is frequently desirable in this process to distribute the products of an incoming product stream such that the outgoing product stream has a different grouping—also called a format set. For example, the incoming product stream can comprise individual products or product portions arranged behind one another, while the outgoing product stream has groups of two, three, four or more products or product portions—simply products in the following—arranged next to one another. A distributor conveyor movable transverse to the conveying direction can be arranged between an ingoing conveyor and an outgoing conveyor to effect such a product distribution. Such a system is disclosed in DE 101 43 506 A1. Apparatus for distributing conveyed product streams are furthermore also disclosed in DE 196 17 187 A1 and in DE 619 395.

In the food industry, the manufacturers/processors of food products are becoming increasingly more demanding and desire a plurality of different distribution variants. It is in particular desired to change from one distribution variant to another distribution variant with a relatively small effort. The flexibility of existing systems is frequently seen as too small in this respect. A further problem is the unwanted rotating of products or product portions when they are transported obliquely to the conveying direction.

SUMMARY OF THE INVENTION

It is an object of the invention to allow a higher performance and a higher flexibility in the distribution of a stream of products without complex and/or expensive additional technologies.

The object is satisfied by an apparatus having the features of claim 1.

In accordance with the invention, an apparatus for distributing a stream of products comprises an ingoing conveyor and an outgoing conveyor, which are configured to convey the products along a conveying direction and which are arranged behind one another viewed in the conveying direction, and at least two, in particular at most three, distributor conveyors, which are arranged behind one another viewed in the conveying direction between the ingoing conveyor and the outgoing conveyor and which are each configured to convey the products along the conveying direction. The distributor conveyors are displaceable independently of one another transverse to the conveying direction in accordance with the invention.

Since the products are only transported along the conveying direction or transverse to the conveying direction during the distribution process, but not obliquely to the conveying direction, no unwanted rotating of the products occurs. It was found in accordance with the invention that a plurality of different distribution variants can be provided with a relatively small number of, for example, two or three distributor conveyors movable transverse to the conveying direction. In particular no conversion effort or only a small conversion effort is thus required on a desired change of the distribution variant. Furthermore, the total conveyor device can be operated at a relatively high performance since the transporting away takes place line-wise and not format set-wise. This means that an individual group of products or product portions located next to one another is transported away per unit of time.

Further developments of the invention are set forth in the dependent claims, in the description and in the enclosed drawing.

At least one distributor conveyor, in particular every distributor conveyor, is preferably drivable only in the conveying direction. In other words, it is preferred that the distributor conveyors are not operated against the conveying direction, that is backward, during the distribution process. This is also meant in the sense that a control device of the distributor apparatus provides that the distributor conveyors are only operated in the forward direction, even if they could generally convey backward on the basis of the mechanical circumstances.

In accordance with an aspect of the invention, at least one, in particular exactly one, further distributor conveyor is arranged between the ingoing conveyor and the outgoing conveyor and can be displaced transverse to the conveying direction independently of the other distributor conveyors. The flexibility of the distributor apparatus can hereby be further increased. Additional distribution variants can in particular be provided in comparison with an embodiment having only two distributor conveyors; for example, a distribution of an incoming stream of three respective products arranged next to one another to an outgoing stream of a respective four products arranged next to one another.

Furthermore, at least one of the distributor conveyors can be divided into at least two parts, in particular exactly two parts disposed next to one another, with respect to the conveying direction, with the parts being drivable independently of one another. An incoming product line of a plurality of products located next to one another can hereby be divided in that, for example, a part of the product line is "parked" on the left hand part of the respective distributor conveyor, while the remaining products of the product line are conveyed onward on the right hand part of the distributor conveyor. It is equally e.g. possible to accept subsequent products on one conveyor part without conveying onward products located on the other conveyor part. It is hereby in particular possible to distribute an incoming product stream such that the products of a product line are distributed from an even number to an odd number or vice versa.

The distributor conveyor at the very front viewed in the conveying direction is preferably divided into at least two, in particular exactly two, parts disposed next to one another with respect to the conveying direction and drivable independently of one another. This has proved to be particularly favorable with respect to the achievable distribution options.

In accordance with an embodiment of the invention, each of the distributor conveyors is divided into at least two, in particular exactly two parts disposed next to one another with respect to the conveying direction and drivable independently of one another. The flexibility can hereby be further increased with an only small additional effort.

In accordance with a further embodiment of the invention, each of the two parts of ever divided distributor conveyor has a plurality of conveying tracks located next to one another for the parallel conveying of products, with in particular the number of conveying tracks amounting to exactly half the maximum number of conveying tracks of the incoming conveyor and/or of the outgoing conveyor. This means that every part of a distributor conveyor can take up not only an individual product, but also a group of a plurality of products located next to one another. The number of possible distribution patterns can thus be further increased. The distribution of the products incoming next to one another on the ingoing conveyor to the two parts of a divided distributor conveyor can also be asymmetrical. This means that a part of a distributor conveyor can take up a group of three products located next to one another with a four-track ingoing conveyor, for example. It is in principle also possible that with a specific distribution variant one part of a distributor conveyor serves all the conveying tracks of the ingoing conveyor.

The distributor conveyors present preferably each have a plurality of conveying tracks located next to one another for the parallel conveying of groups of products or product portions, with in particular the number of conveying tracks being equal to the maximum number of conveying tracks of the incoming conveyor and/or of the outgoing conveyor.

Furthermore, at least one, in particular each of the distributor conveyors can be displaceable starting from a center position by at most one conveying track transverse to the conveying direction. The displaceability is preferably given by at most one conveying track transverse to the conveying direction in both directions starting from a center position so that therefore the respective distributor conveyor is displaced, e.g. starting from a position displaced maximally to the left, by two conveying tracks into a position displaced maximally to the right. This in particular allows a compact design of the total system.

Furthermore, the distributor conveyors can each have a length with respect to the conveying direction which is just sufficient for taking up one product of a stream of products conveyed after to one another. In particular the space requirements of the apparatus viewed in the conveying direction can hereby be kept small.

The distributor conveyors are preferably each configured as band conveyors or belt conveyors. This has in particular proved favorable from hygienic aspects. In principle, however, roller conveyors or the like could also be provided.

It is furthermore possible that the incoming conveyor, the outgoing conveyor and the distributor conveyors have the same conveying width. A compact design of the total system thereby results. An arrangement which differs therefrom, which is likewise possible in accordance with the invention and in which the distributor conveyors are wider or narrower than the incoming conveyor, in particular provides advantages with respect to the flexibility in comparison.

The incoming conveyor, the distributor conveyors and the outgoing conveyor are preferably arranged following one another without any mutual overlapping along the conveying direction. Such an overlap-free arrangement in particular allows a simple replacement of the distributor conveyors. The arrangement of distributor conveyors can, for example, have a modular structure so that it can be easily replaced as a whole with another module. This is above all advantageous for an operator of a food processing system since, for example by a module replacement, a simple expansion of the system to a larger number of available distribution patterns is possible.

The incoming conveyor and/or the outgoing conveyor can be configured for a line-wise conveying of the products in the conveying direction. This means that a group of products disposed next to one another, but not behind one another, with respect to the conveying direction is always conveyed by the incoming conveyor or by the outgoing conveyor respectively per unit in time.

At least two, and preferably all the distributor conveyors are in particular of the same construction or are identical. Such a modular design is especially inexpensive and allows a simple and fast conversion or reconfiguration of the apparatus.

The distributor conveyors can each comprise belt conveyors or band conveyors or can be configured as belt conveyors or band conveyors. This is, however, not compulsory. At least some of the distributor conveyors can e.g. comprise a respective so-called plate distributor or can be configured as a plate distributor. Individual platelets or plates or flat conveying elements, in particular with a transverse orientation, can in particular be provided instead of belts and can in particular be moved in the manner of an earthmover. The specific embodiment of the distributor conveyors is thus at the discretion of the skilled person within the framework of the invention. Generally, any distributor conveyor is conceivable which is able both to set at least a part of a product line in a transverse direction and to convey at least a part of a product line in the conveying direction.

This invention also relates to a method of distributing a stream of products, in particular food products, from an ingoing conveyor conveying the products line-wise in a conveying direction to an outgoing conveyor arranged behind the ingoing conveyor viewed in the conveying direction and conveying the products line-wise in the conveying direction, in particular by means of an apparatus as described above.

In accordance with the invention, a product line is conveyed from the ingoing conveyor to a first distributor conveyor. The first distributor conveyor is displaced transverse to the conveying direction. At least a part of the product line is conveyed by the displaced first distributor conveyor to a second distributor conveyor. The first distributor conveyor is again displaced transverse to the conveying direction. At least a part of a further product line is conveyed from the first distributor conveyor to the second distributor conveyor to form an expanded product line. At least a part of the expanded product line is conveyed from the second distributor conveyor to the outgoing conveyor or to a further distributor conveyor.

It is hereby possible to prepare expanded product lines from incoming product lines with a predefined cycle.

It must be pointed out that the above-named method steps do not necessarily have to be carried out in the order in which they are named.

Every product line conveyed by the ingoing conveyor preferably comprises one or more products disposed next to one another with respect to the conveying direction, with at least two parts of a product line being conveyed onto the second distributor conveyor, to the starting conveyor and/or to the further distributor conveyor at different points in time. It is hereby in particular possible to distribute an incoming product stream such that the products of a product group are distributed from an even number to an odd number or vice versa.

At least one distributor conveyor, in particular every distributor conveyor, is preferably drivable only in the conveying direction.

Provision can furthermore be made that at least one, in particular each of the distributor conveyors is displaced starting from a center position by at most one conveying track transverse to the conveying direction.

It must be pointed out that the invention furthermore covers all distribution methods which can be carried out using the apparatus as described above and below.

Generally, a control or a control program is preferably provided for each apparatus or each method of the kind described and claimed above and below, said control or control program controlling the apparatus in the respectively stated manner, with it not being precluded that the apparatus controlled in this manner is configured in a constructive respect such that it can also be operated in a different manner.

BRIEF DESCRIPTION OF THE DRAWINGS

The invention will be described in the following by way of example with reference to the drawings.

DETAILED DESCRIPTION OF THE PREFERRED EMBODIMENTS

The apparatus shown in FIGS. 1a to 1g serves for the distribution of a stream of food products 11 conveyed linewise along a conveying direction F, said food products, for example, being able to be slices of sausage or cheese or e.g. stacked or overlapping arrangements or portions of such slices. The products 11 are conveyed line-wise on an ingoing conveyor 13—for example starting from a slicer, not shown, or from a preceding product conveyor—along the conveying direction F up to a first distributor conveyor 17. A second distributor conveyor 19 is arranged behind the first distributor conveyor viewed in the conveying direction F. The first distributor conveyor 17 is able to convey the products 11 incoming on the ingoing conveyor 13 to the second distributor conveyor 19. The second distributor conveyor 19 is able to convey the products 11 along the conveying direction F to an outgoing conveyor 15 which is located behind it viewed in the conveying direction F and on which the products 11 are supplied to a following product processing apparatus, not shown, such as a packaging machine. To illustrate the distribution process, the products 11 are marked by numbers in accordance with the order of their arrival at the first distributor conveyor 17.

The two distributor conveyors 17, 19 are displaced independently of one another transverse to the conveying direction F. In addition, the distributor conveyor 19 at the front viewed in the conveying direction F is divided into two parts 19a, 19b disposed next to one another with respect to the conveying direction F and drivable independently of one another. The transverse displacement of the distributor conveyors 17, 19 can take place, for example, via linear drives, not shown. A stream of products 11 incoming line-wise on the ingoing conveyor 13 is distributed by means of the two distributor conveyors 17, 19 into a stream of products 1, that is resorted, outgoing line-wise on the outgoing conveyor 15, with the outgoing stream of products 11 having more products 11 per line than the incoming stream of products 11.

Figure 1A:
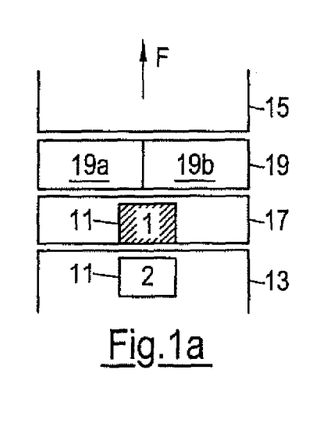
FIGS. 1a to 1g show an apparatus for distributing a stream of products in accordance with a first embodiment of the invention which converts a stream of product lines comprising one product into a stream of product lines comprising two products.
Figure 1B:
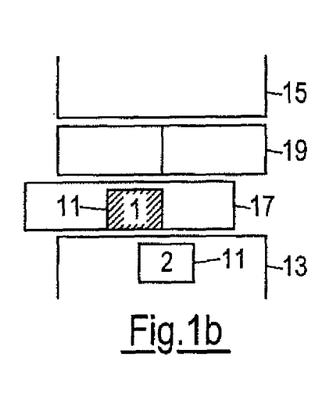
Figure 1C:
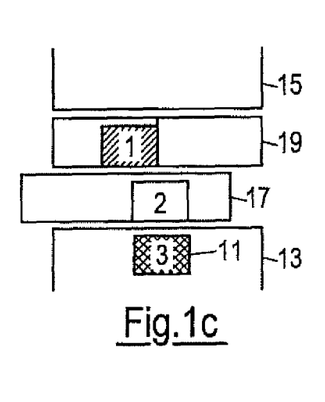
Figure 1D:
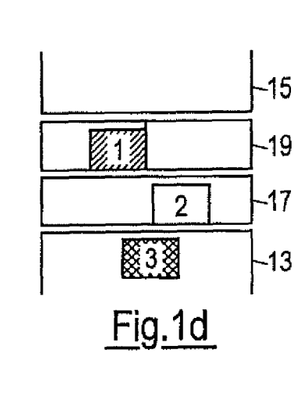
Figure 1E:
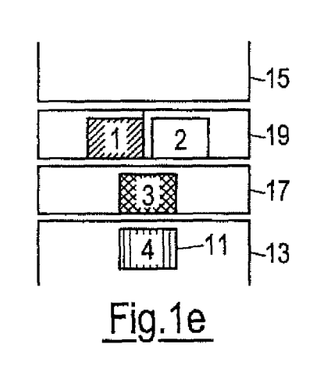
Figure 1F:
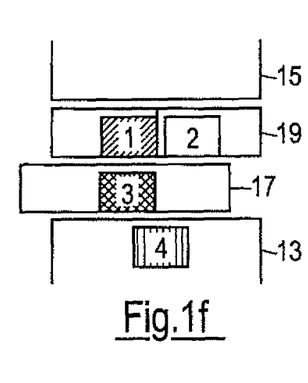
Figure 1G:
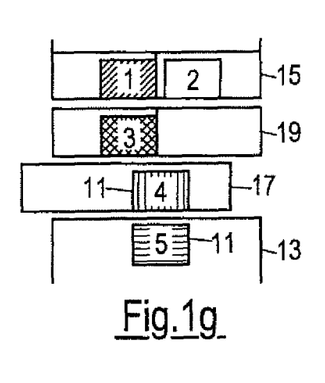

In FIGS. 1a to 1g, a so-called 1/2 distribution is shown in which the products 11 are supplied in lines having a single product 11 and are conducted away in lines having two products 11 disposed next to one another. FIG. 1a shows an operating state in which the first supplied product 11 having the number 1 has been transferred from the ingoing conveyor 13 onto the first distributor conveyor 17. Before the subsequent product 11 having the number 2 is transferred to the first distributor conveyor 17, the latter is displaced to the left in the drawing (FIG. 1b) by approximately half a product width. In a subsequent step shown in FIG. 1c, the product 11 having the number 2 is conveyed to the first distributor conveyor 17 and the product 11 having the number 1 is conveyed from the first distributor conveyor 17 to the second distributor conveyor 19. The first distributor conveyor 17 is then displaced back into its starting position again in accordance with FIG. 1d, whereby the product 11 having the number 2 is displaced to the right by approximately half a product width. The product 11 having the number 2 is thus located approximately one product width further to the right than the product 11 having the number 1 and can be conveyed next to it to the second distributor conveyor 19. At the same time, the next product 11 having the number 3 is conveyed from the incoming conveyor 13 to the first distributor conveyor 17 located in the starting position (FIG. 1e). The two products 11 having the numbers 1 and 2 and located next to one another are conveyed to the outgoing conveyor 15 and go out as a new product line. At the same time, the products 11 having the numbers 3 and 45 are placed, as described above, next to one another on the second distributor conveyor 19. As a result, the number of products 11 per product line is thus doubled from one to two.

Figure 2A:
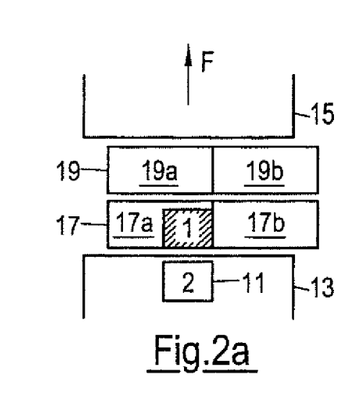
FIGS. 2a to 2h show an apparatus for distributing a stream of products in accordance with a second embodiment of the invention which converts a stream of product lines comprising one product into a stream of product lines comprising three products.
Figure 2B:
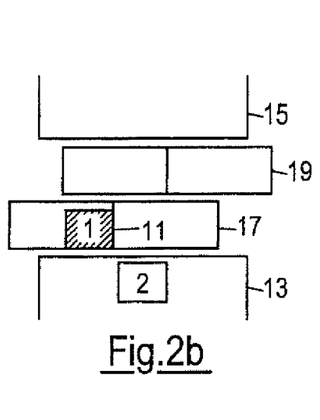
Figure 2C:
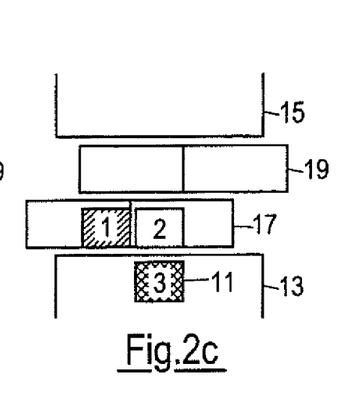
Figure 2D:
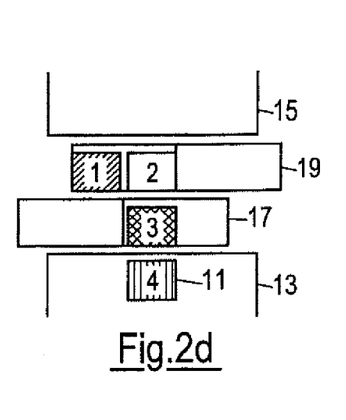
Figure 2E:
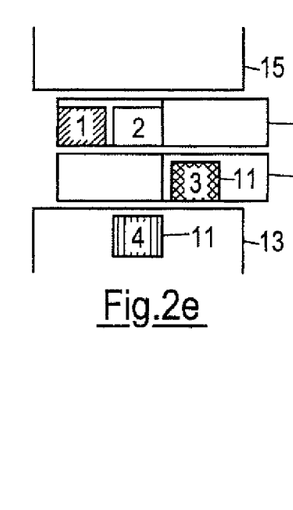
Figure 2F:
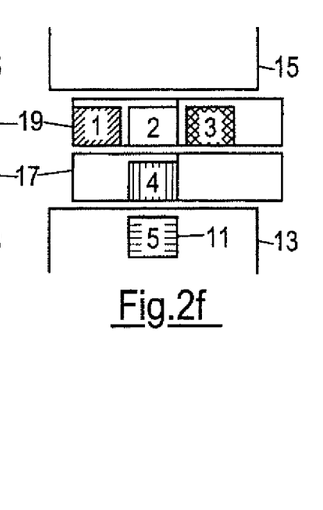
Figure 2G:
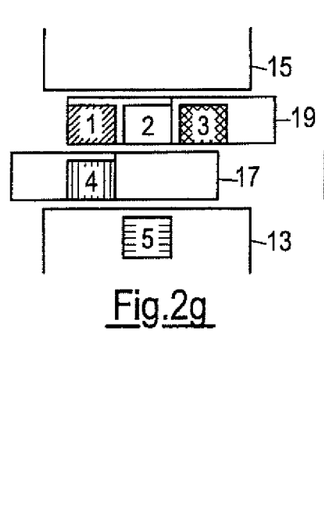
Figure 2H:
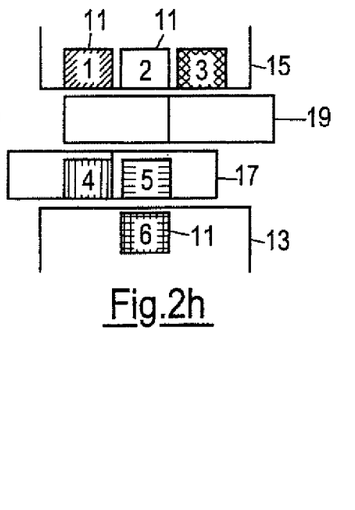

FIGS. 2a to 2h show a similar apparatus to the one described above, but with both distributor conveyors 17, 19 being divided into two parts 17a, 17b, 19a, 19b disposed next to one another with respect to the conveying direction F and each being drivable independently of one another. A 1/3 distribution is shown as a procedure in which distribution the products 11 are supplied in lines having a single product 11 and are conducted away in lines having three products 11 disposed next to one another. Since the distributor conveyor 17 at the rear viewed in the conveying direction F is also divided into two parts 17a, 17b drivable independently of one another, the products 11 having the numbers 1 and 2 can already be placed next to one another on this first distributor conveyor 17 and can be subsequently conveyed to the part 19a of the second distributor 19 at the left in the drawing. The next product 11 having the number 3 is then conveyed, after a corresponding transverse displacement of the first distributor conveyor 17, next to the two products 11 having the numbers 1 and 2 onto the second distributor conveyor 19 (FIG. 2e). The products 11 having the numbers 1, 2 and 3 and located next to one another can thus be conveyed as an outgoing product line to the outgoing conveyor 15, while the next products 11 having the numbers 4, 5 and 6 are positioned next to one another as described above.

Figure 3A:
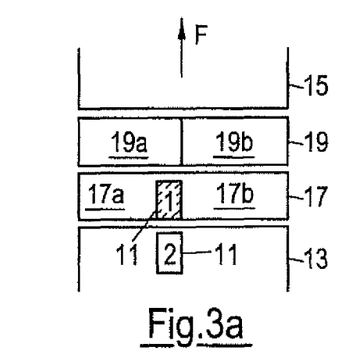
FIGS. 3a to 3h show the apparatus in accordance with FIGS. 2a to 2h on the conversion of a stream of product lines comprising one product into a stream of product lines comprising four products.
Figure 3B:
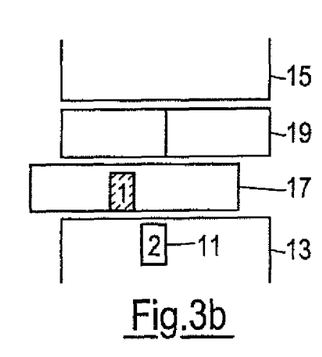
Figure 3C:
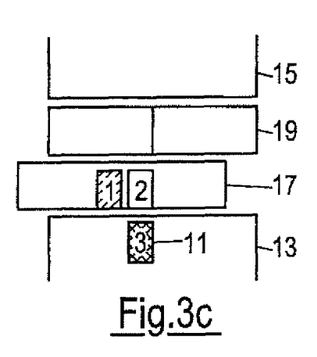
Figure 3D:
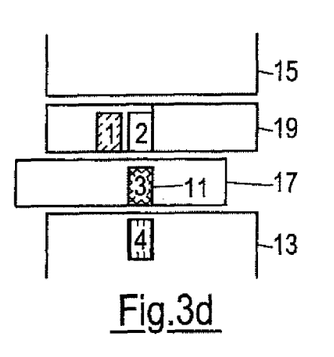
Figure 3E:
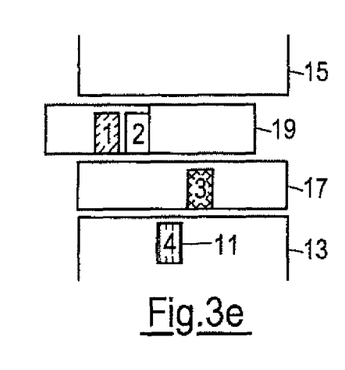
Figure 3F:
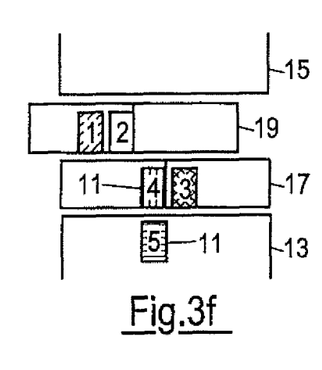
Figure 3G:
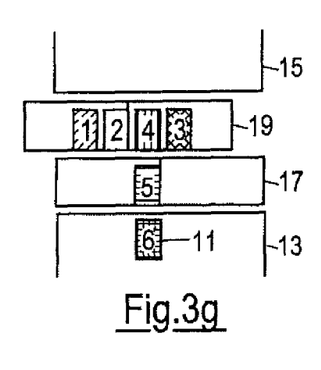
Figure 3H:
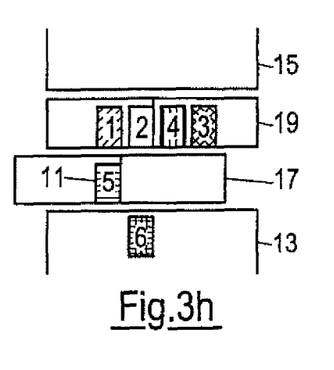
Figure 4A:
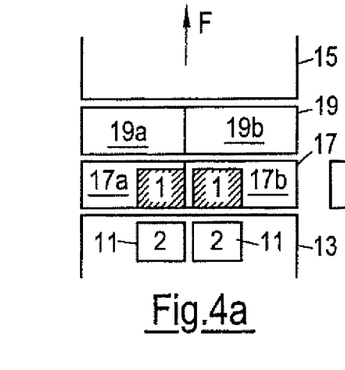
FIGS. 4a to 4h show the apparatus in accordance with FIGS. 2a to 2h on the conversion of a stream of product lines comprising two products into a stream of product lines comprising three products.
Figure 4B:
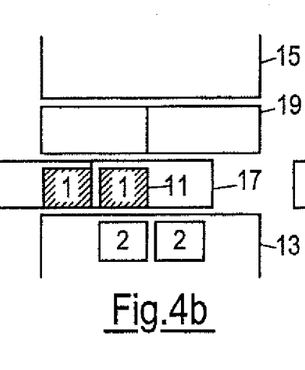
Figure 4C:
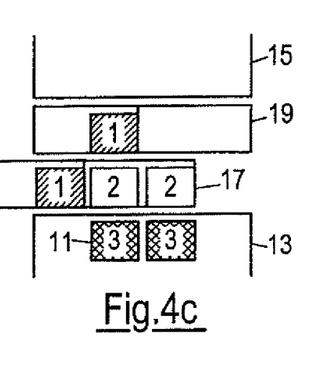
Figure 4D:
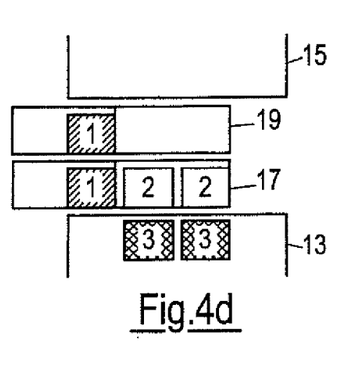
Figure 4E:
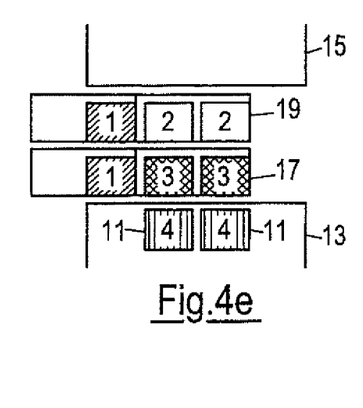
Figure 4F:
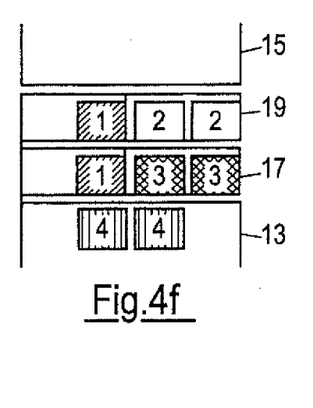
Figure 4G:
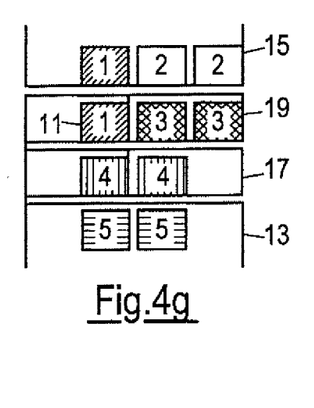
Figure 4H:
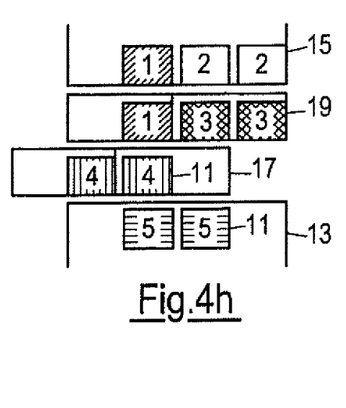
Figure 5A:
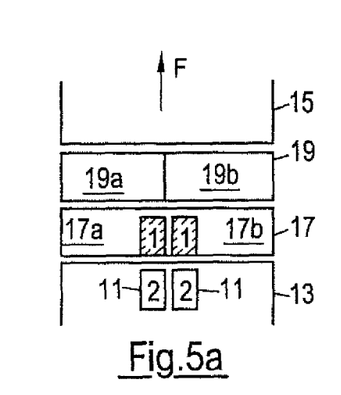
FIGS. 5a to 5g show the apparatus in accordance with FIGS. 1a to 1g on the conversion of a stream of product lines comprising two products into a stream of product lines comprising four products.
Figure 5B:
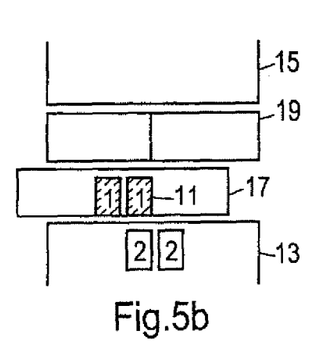
Figure 5C:
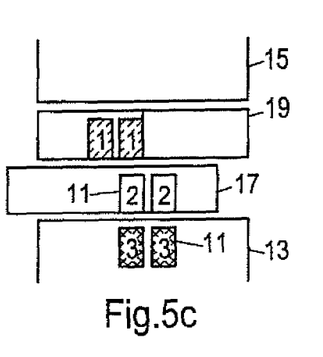
Figure 5D:
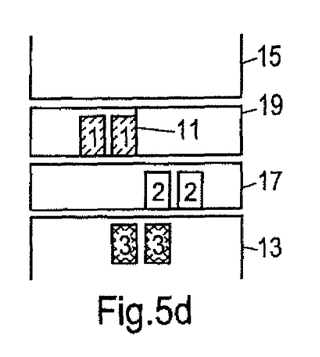
Figure 5E:
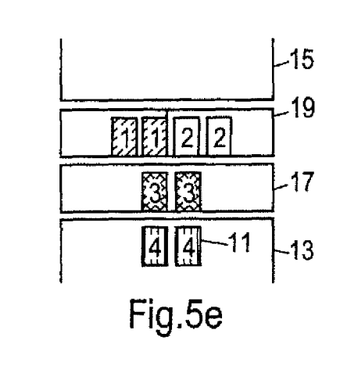
Figure 5F:
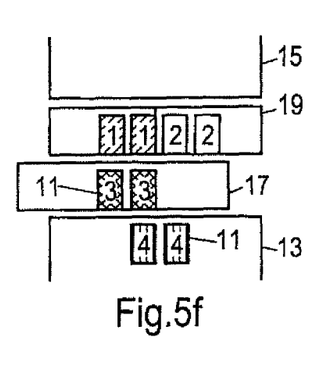
Figure 5G:
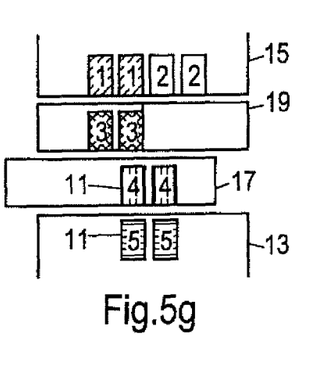
Figure 6A:
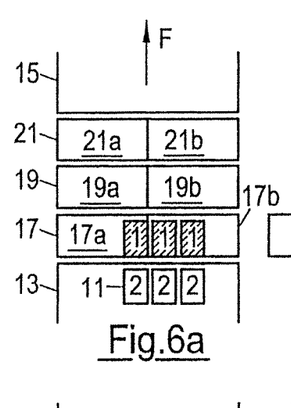
FIGS. 6a to 6j show an apparatus for distributing a stream of products in accordance with a third embodiment of the invention which converts a stream of product lines comprising three products into a stream of product lines comprising four products.
Figure 6B:
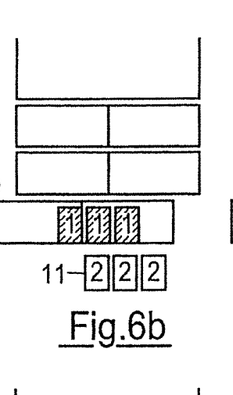
Figures 6C, 6D, 6E:
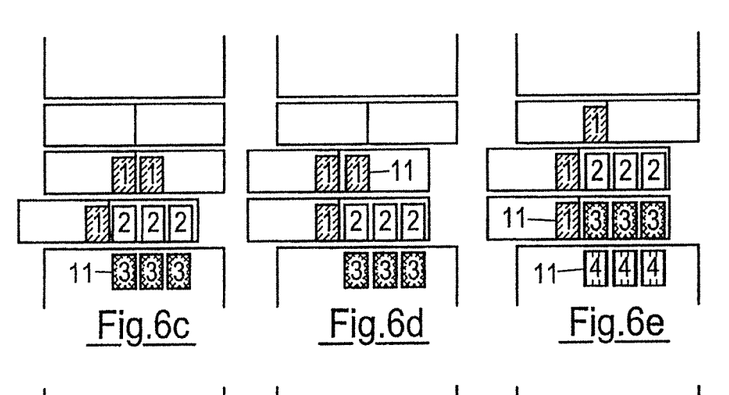
Figure 6F:
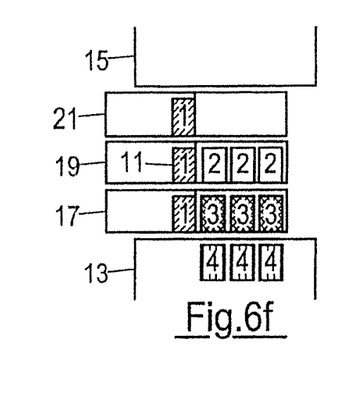
Figure 6G:
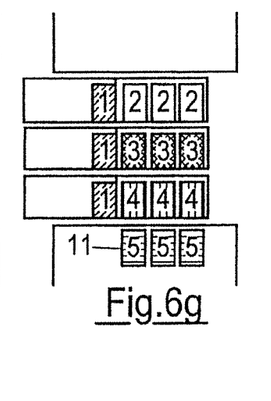
Figure 6H:
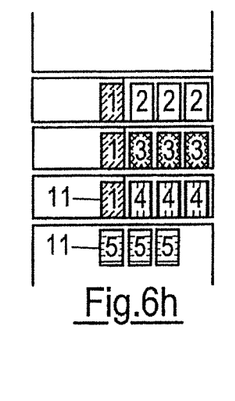
Figure 6I:
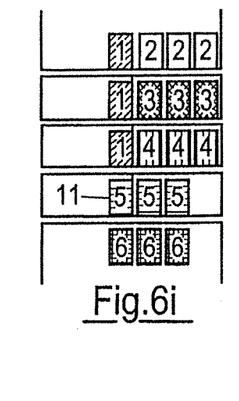
Figure 6J:
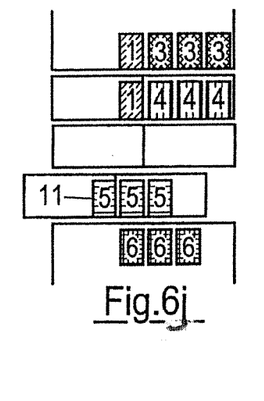
Figure 7A:
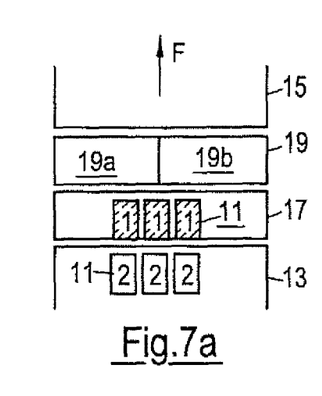
FIGS. 7a to 7g show the apparatus in accordance with FIGS. 1a to 1g on the conversion of a stream of product lines comprising three products into a stream of product lines comprising six products.
Figure 7B:
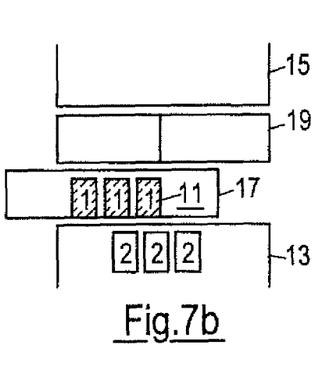
Figure 7C:
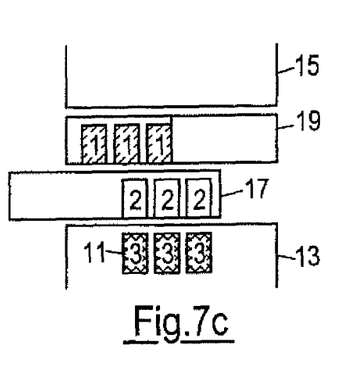
Figure 7D:
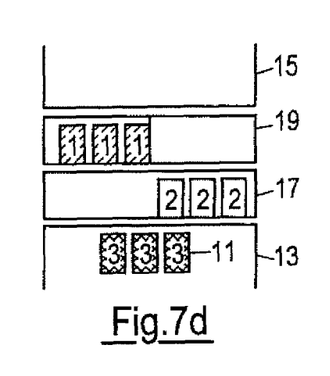
Figure 7E:
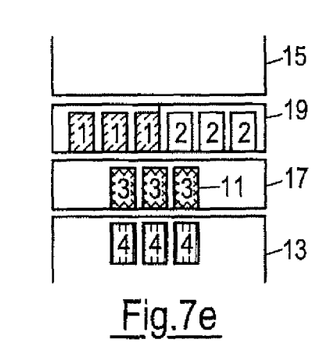
Figure 7F:
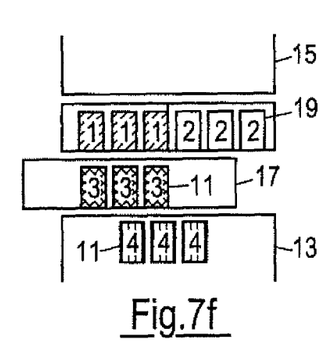
Figure 7G:
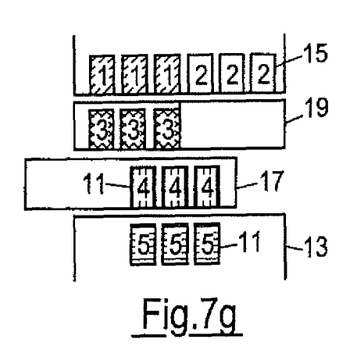
Figure 8A:
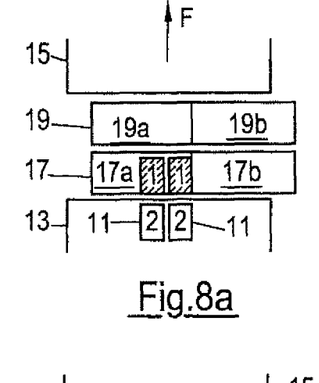
FIGS. 8a to 8h show the apparatus in accordance with FIGS. 2a to 2h on the conversion of a stream of product lines comprising two products into a stream of product lines comprising six products.
Figure 8B:
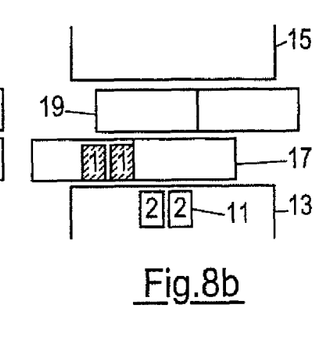
Figures 8C, 8D:
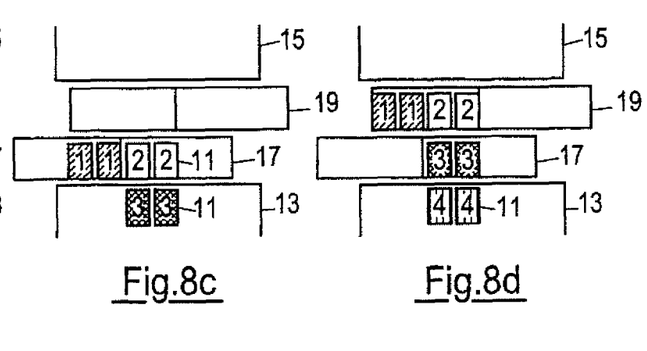
Figure 8E:
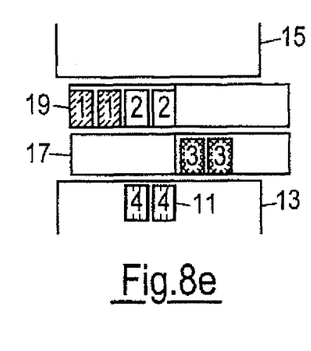
Figure 8F:
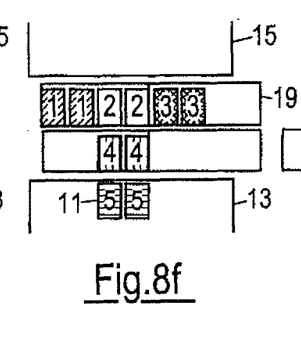
Figure 8G:
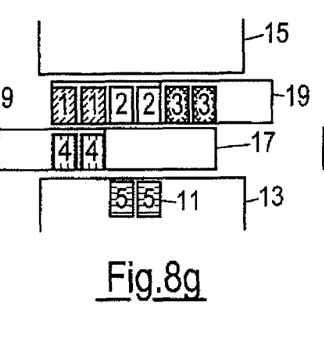
Figure 8H:
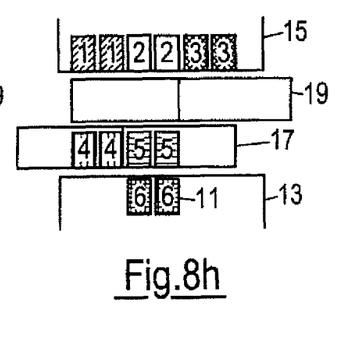

The same apparatus is shown in FIGS. 3a to 3a as in FIGS. 2a to 2h, but with a 1/4 distribution being shown as the procedure, in which distribution the products 11 are supplied in lines having a single product 11 and being conducted away in lines having four products disposed next to one another. First, the products 11 having the numbers 1 and 2 are placed next to one another on the first distributor conveyor 17 with a displacement thereof to the left (FIGS. 3a to 3c). Subsequently, with a reverse displacement of the first distributor conveyor 17 into the starting position, a placing of the products 11 having the numbers 3 and 4 next to one another is carried out, with the product 11 having the number 3 coming to lie to the right of the product 11 having the number 4 on the first distributor conveyor 11 (FIGS. 3d to 3f). The second distributor conveyor 19 is then displaced to the left such that the products 11 having the numbers 3 and 4 and located next to one another can be conveyed next to the products 11 having the numbers 1 and 2 to the second distributor conveyor 19 and subsequently from this onto the outgoing conveyor 15 (FIGS. 3g and 3h). The next product 11 having the number 5 then forms the first element of a new product line to be prepared.

The apparatus in accordance with FIGS. 2a to 2h is in turn shown in FIGS. 4a to 4h, but with here a 2/3 distribution being shown as the procedure, in which distribution the products 11 are supplied in lines having two products 11 and are conducted away in lines having three products 11. As can be seen from FIGS. 4a to 4c, the products 11 of the first product line having the number 1 are first conveyed to the first distributor conveyor 17. Since this is divided, one of these products 11 can be conveyed to the second distributor conveyor 19, while the other product 11 remains on the first distributor conveyor 17 and simultaneously the two products 11 having the number 2 are placed to the right next thereto on the first distributor conveyor 17. Subsequently, in accordance with FIG. 4d, the second distributor conveyor 19 is moved into the same transverse position as the first distributor conveyor 17. Then, in accordance with FIG. 4e, the products 11 having the number 2 and the products 11 having the number 3 are conveyed forward by one position in the conveying direction F, while the products 11 having the number 1 remain on the—stationary—left hand parts 17a, 19a of the distributor conveyors 17, 19. In accordance with FIG. 4f, a respective three products 11 thus come to lie next to one another on both distributor conveyors 17, 19. They can then be conveyed after one another as product lines to the outgoing conveyor 15, while the products 11 of the two following product lines having the numbers 4 and 5 are moved as described above.

FIGS. 5a to 5g relate to an apparatus as shown in FIGS. 1a to 1g, that is the first distributor conveyor 17 is not divided into two parts drivable independently of one another. A 2/4 distribution is shown as the procedure here in which distribution the products 11 are supplied in lines having two products 11 and are conducted away in lines having three products 11. The procedure is analog to the 1/2 distribution in accordance with FIGS. 1a to 1g, but with the first distributor conveyor 17 being transverse displaced by approximately a whole product width.

In FIGS. 6a to 6j, an apparatus in accordance with a further embodiment of the invention is shown in which three distributor conveyors 17, 19, 21 arranged behind one another viewed in the conveying direction F are arranged between the ingoing conveyor 13 and the outgoing conveyor 15. All three distributor conveyors 17, 19, 21 are divided into parts 17a, 17b, 19a, 19b, 21a, 21b disposed next to one another with respect to the conveying direction F, with the parts each being drivable independently of one another. A 3/4 distribution is shown as a procedure in which distribution the products 11 are supplied in lines having three products 11 and are conducted away in lines having four products 11. For this purpose, the three products 11 of the first product line having the number 1 are positioned after one another on the three distributor conveyors 17, 19, 21, and indeed on the left hand parts 17a, 19a, 21a, in the drawing (FIGS. 6a to 6f). These parts 17a, 19a, 21a are then stopped, while the products 11 of three following product lines having the numbers 2, 3 and 4 are conveyed onto the right hand parts 17b, 19b, 21b of the distributor conveyors 17, 19, 21. In accordance with FIG. 6h, products groups of four products 11 are then located on all three distributor conveyors 17, 19, 21. They can be conveyed onto the outgoing conveyor 15 as product lines after one another. The three products 11 of the next product line having the number 5 are then treated in the same way as before the three products 11 of the first product line having the number 1.

FIGS. 7a to 7g in turn relate to the embodiment shown in FIGS. 1a to 1g having only two distributor conveyors 17, 19 of which the distributor conveyor 19 at the front viewed in the conveying direction F is divided into two parts. A 3/6 distribution is shown as the procedure in which distribution the products 11 are supplied in lines having three products 11 and are conducted away in lines having six products 11. The procedure is analog to the procedure in accordance with FIGS. 1a to 1g, that is two respective complete product lines having three products 11 are positioned next to one another on the second distributor conveyor 19 in order thus to double the number of products 11 for the outgoing product line to six.

The apparatus in accordance with FIGS. 2a to 2h is in turn shown in FIGS. 8a to 8h, with a 2/6 distribution being shown as the procedure, in which distribution the products 11 are supplied in lines having two products 11 and are conducted away in lines having six products 11. The two distributor conveyors 17, 19 are displaceable for this purpose by approximately two product widths transverse to the conveying direction F. In all other respects, the procedure is analog to the procedure in accordance with FIGS. 2a to 2h.

Figure 9A:
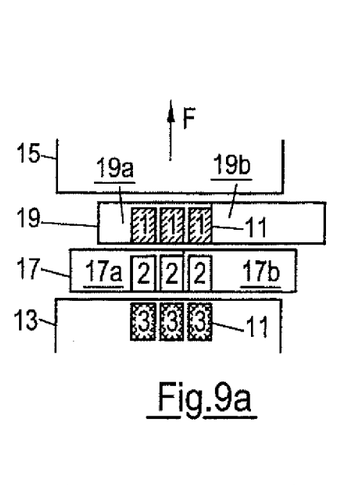
FIGS. 9a to 9h show the apparatus in accordance with FIGS. 8a to 8h on the conversion of a stream of product lines comprising three products into a stream of product lines comprising five products.
Figure 9B:
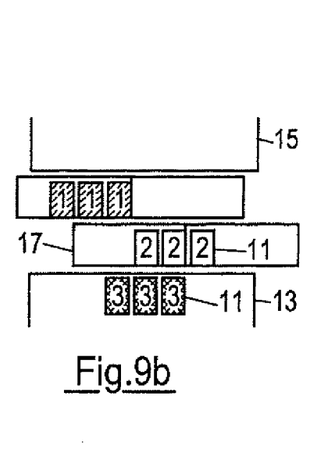
Figure 9C:
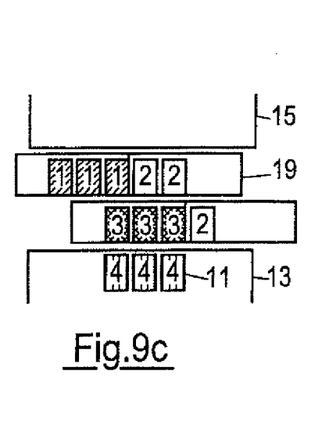
Figure 9D:
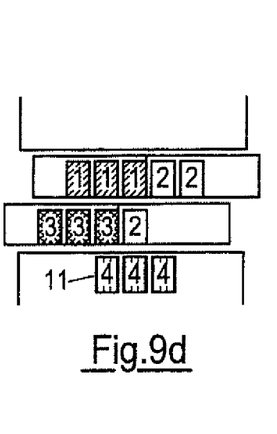
Figure 9E:
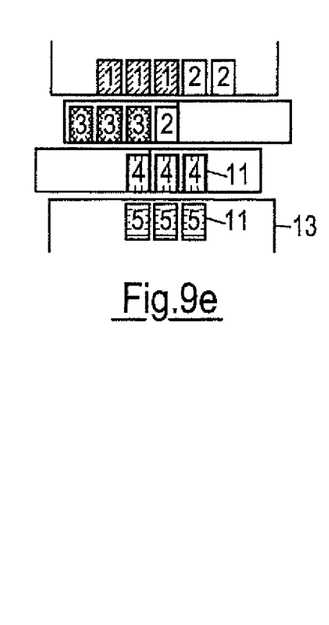
Figure 9F:
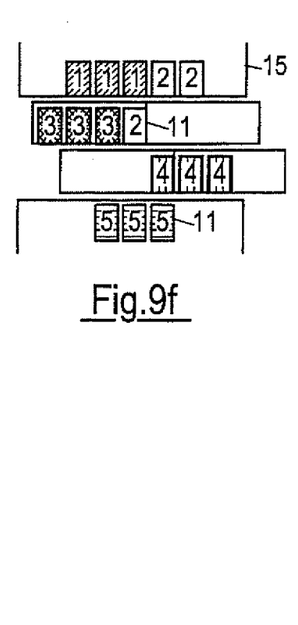
Figure 9G:
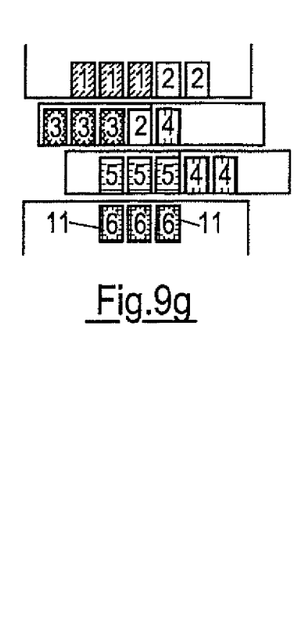
Figure 9H:
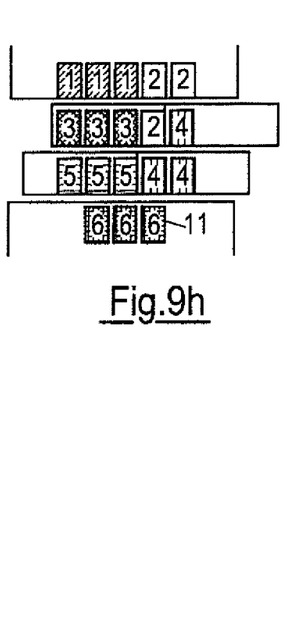
Figure 10A:
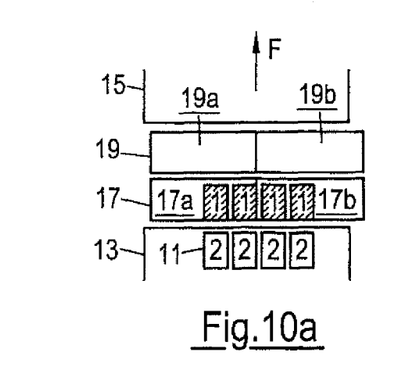
FIGS. 10a to 10g show the apparatus in accordance with FIGS. 8a to 8h on the conversion of a stream of product lines comprising four products into a stream of product lines comprising six products.
Figure 10B:
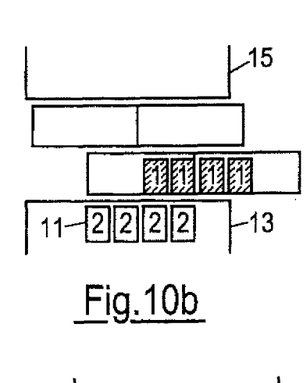
Figure 10C:
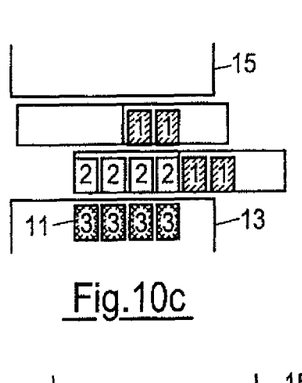
Figure 10D:
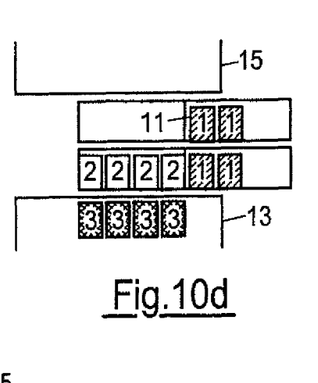
Figure 10E:
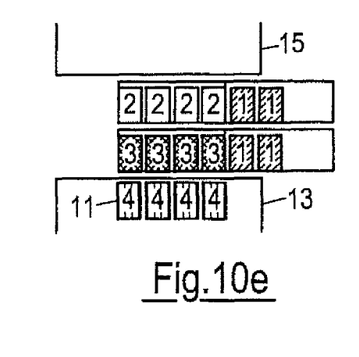
Figure 10F:
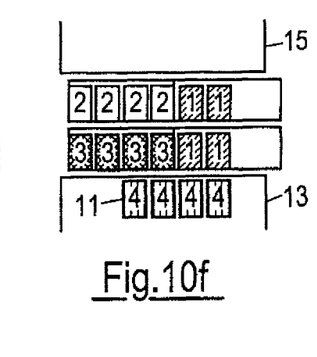
Figure 10G:
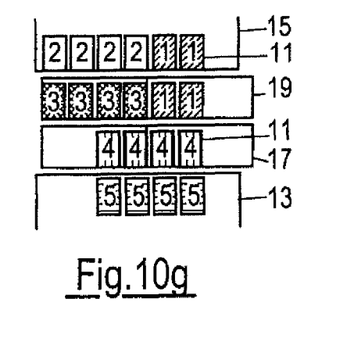
Figure 11A:
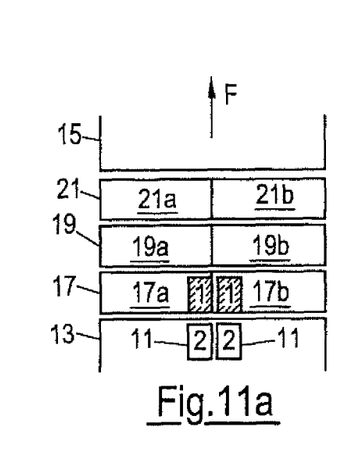
FIGS. 11a to 11h and FIGS. 12a to 12f show the apparatus in accordance with FIGS. 6a to 6j on the conversion of a stream of product lines comprising two products into a stream of product lines comprising five products.
Figure 11B:
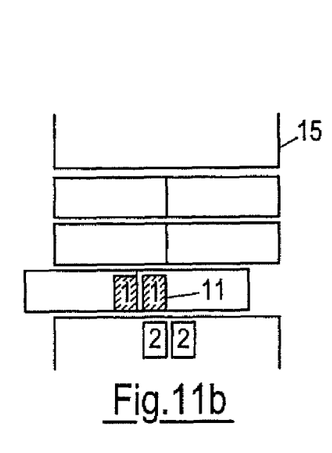
Figure 11C:
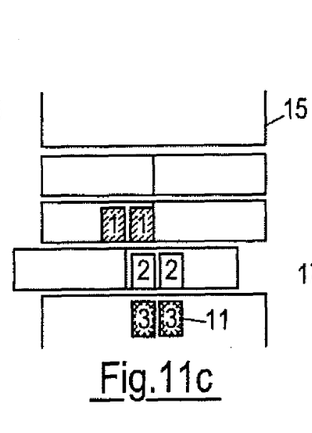
Figure 11D:
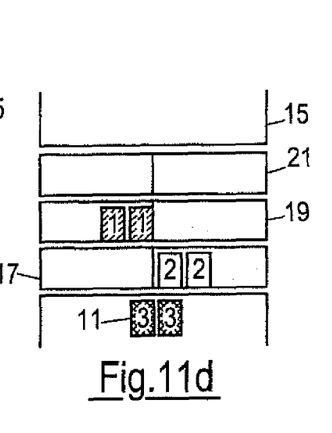
Figure 11E:
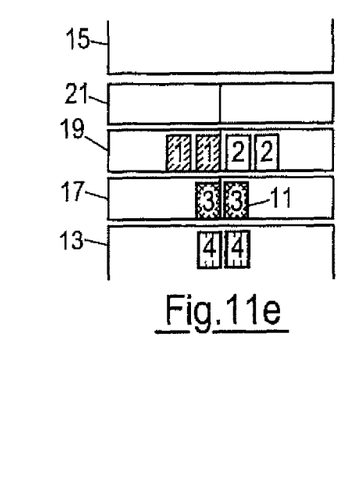
Figure 11F:
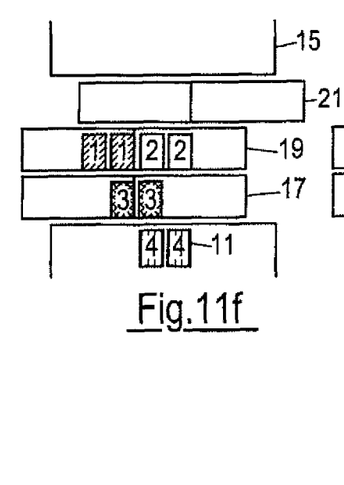
Figure 11G:
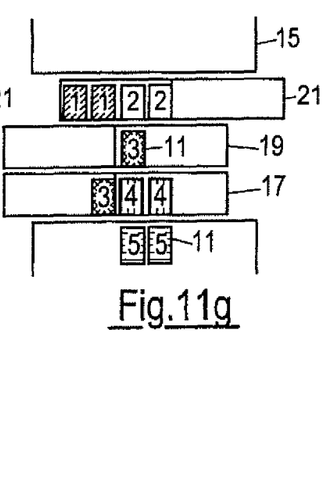
Figure 11H:
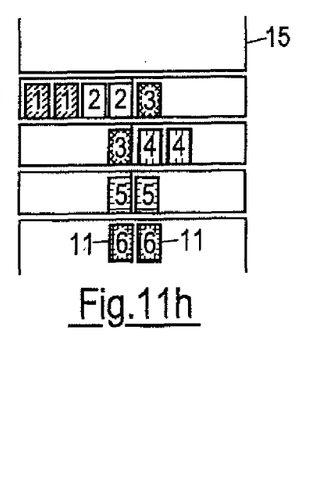
Figure 12A:
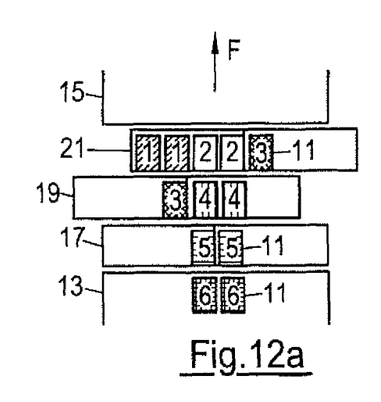
Figure 12B:
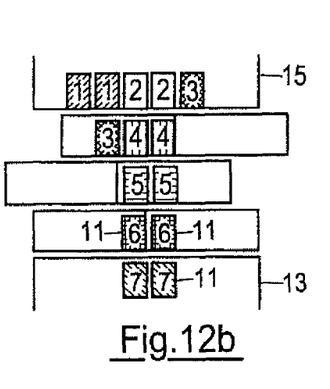
Figure 12C:
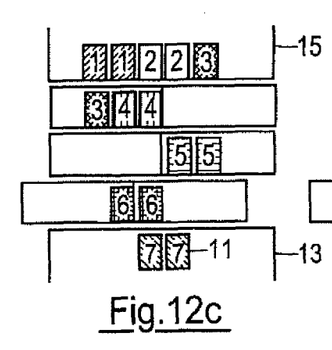
Figure 12D:
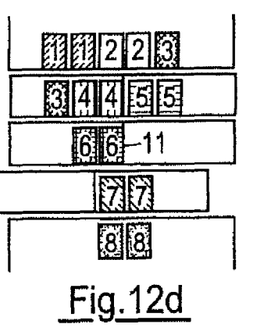
Figure 12E:
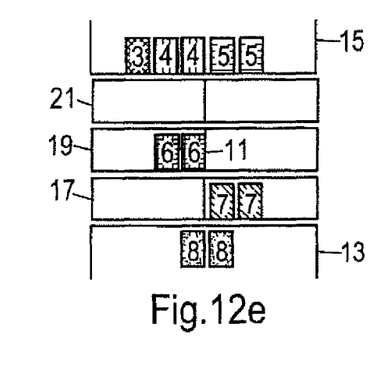
Figure 12F:
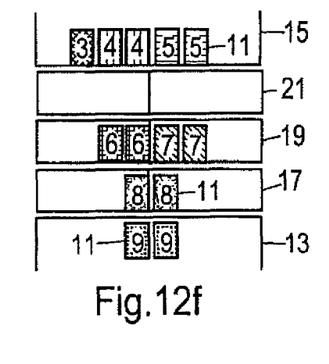

FIGS. 9a to 9h also relate to the apparatus shown in FIGS. 8a to 8h, but with here a 3/5 distribution being shown as the procedure in which distribution the products 11 are supplied in lines having three products 11 and are conducted away in lines having five products 11. In this variant, the first incoming product line having the number 1 is first supplemented by two products of the next product line having the number 2 (FIGS. 9a to 9c). A further complete product line having the number 3 is added to the remaining product having the number 2 (FIG. 9d). After a corresponding transverse displacement of the first distributor conveyor 17, a product 11 of a product line following in turn and having the number 4 is then placed on the other side next to the product 11 having the number 2 so that a product line results of products 11 having the numbers 3, 3, 3, 2 and 4 (FIGS. 9e to 9g). At the same time, the preparation of a further product line of products 11 having the numbers 5 and 4 is started.

FIGS. 10a to 10g show the same apparatus as FIGS. 9a to 9h, but with here a 4/6 distribution being shown as the procedure in which distribution the products 11 are supplies in lines having four products and are conducted away in rows having six products. The procedure of the worksteps takes place analog to FIGS. 4a to 4h, with two respective products 11 disposed next to one another being treated synchronously. For this purpose, the two distributor conveyors 17, 19 are displaceable by approximately two product widths transverse to the conveying direction F.

In FIGS. 11a to 11h as well as 12a to 12f, the apparatus shown in FIGS. 6a to 6j is in turn shown which has three divided distributor conveyors 17, 19, 21. A 2/5 distribution is shown as a procedure in which distribution the products 11 are supplied in lines having two products 11 and are conducted away in lines having five products 11. For this purpose, the two product lines having the numbers 1 and 2 are first placed next to one another on the second distributor conveyor 19 (FIGS. 11a to 11e). One product 11 from the following product line having the number 3 is added at the right to the two product groups located next to one another and having the numbers 1 and 2 while the other product 11 of the product line having the number 3 remains on the second distributor conveyor 19. The two following product lines having the numbers 4 and 5 are then added thereto at the right (FIGS. 11h, 12a to 12d). A product line having five products 11 is thus formed on the third distributor conveyor 21 and is composed of products 11 having the numbers 3, 4, 4, 5 and 5. The following product lines having the numbers 6 and 7 are then placed next to one another in turn and are supplemented by a product 11 of a following product line having the number 8, whereupon the procedure is repeated.

It can be seen from the above-described distribution procedures that no provision is made in accordance with the invention to operate any of the distributor conveyors 17, 19, 21 backward. This can be achieved by a correspondingly configured control, even if the distributor conveyors 17, 19, 21 could also be operated backward in a constructive respect with a corresponding control. It is therefore admittedly possible, but not compulsory, that the distributor conveyors 17, 19, 21 is not able to operate backward for purely construction reasons.

It is rather sufficient here if one of the distributor conveyors 17, 19, 21 or a part of one distributor conveyor 17, 19, 21 is temporarily stopped, that is stationary at times. It is an advantage of the invention that a continuous line-wise conveying of a product stream is possible. In other words, the ingoing conveyor 13 never has to be stopped, which is particularly advantageous with respect to the efficiency of the total system. The cycle of the incoming products 11 is namely usually predefined by the slicer preceding the ingoing conveyor 13 and can only be varied with a high additional effort during operation.

It is of advantage if the ingoing conveyor 13, the outgoing conveyor 15 and the distributor conveyors 17, 19, 21 adjoin one another substantially without a break. It is, however, not necessary to provide overlapping regions between the individual conveyors. Due to this overlap-free arrangement, the conversion effort on a desired change of the distribution is significantly reduced. In addition, the modular total design promotes a fast and simple change between different distribution variants.

The invention claimed is:

1. An apparatus for distributing a stream of products comprising
an ingoing conveyor and an outgoing conveyor which are configured to convey the products along a conveying direction and which are arranged behind one another viewed in the conveying direction; and
at least two distributor conveyors which are arranged behind one another viewed in the conveying direction between the ingoing conveyor and the outgoing conveyor and which are each configured to convey the products along the conveying direction,
wherein the distributor conveyors are displaceable independently of one another transverse to the conveying direction,
wherein only the distributor conveyor at the very front viewed in the conveying direction is divided into at least two parts disposed next to one another with respect to the conveying direction and drivable independently of one another,
wherein at least one of the distributor conveyors is displaceable by at most one conveying track transverse to the conveying direction starting from a center position.

2. The apparatus in accordance with claim 1, wherein at most three distributor conveyors are arranged behind one another viewed in the conveying direction between the ingoing conveyor and the outgoing conveyor and which are each configured to convey the products along the conveying direction.

3. The apparatus in accordance with claim 1, wherein at least one of the distributor conveyors can be driven only in the conveying direction.

4. The apparatus in accordance with claim 1, wherein each of the distributor conveyors can be driven only in the conveying direction.

5. The apparatus in accordance with claim 1, wherein at least one further distributor conveyor is arranged between the ingoing conveyor and the outgoing conveyor and is displaceable independently of the other distributor conveyors transverse to the conveying direction.

6. The apparatus in accordance with claim 1, wherein exactly one further distributor conveyor is arranged between the ingoing conveyor and the outgoing conveyor and is displaceable independently of the other distributor conveyors transverse to the conveying direction.

7. The apparatus in accordance with claim 1, wherein the distributor conveyor at the very front viewed in the conveying direction is divided into exactly two parts disposed next to one another with respect to the conveying direction and drivable independently of one another.

8. The apparatus in accordance with claim 1, wherein each of the at least two parts of the divided distributor conveyor has a plurality of conveying tracks located next to one another for the parallel conveying of products.

9. The apparatus in accordance with claim 8, wherein the number of conveying tracks on each part of the divided distributor conveyor amounts to exactly half the maximum number of conveying tracks of the ingoing conveyor and/or of the outgoing conveyor.

10. The apparatus in accordance with claim 8, wherein each of the distributor conveyors is displaceable by at most one conveying track transverse to the conveying direction starting from a center position.

11. The apparatus in accordance with claim 1, wherein the distributor conveyors each have a plurality of conveying tracks located next to one another for the parallel conveying of groups of products or product portions.

12. The apparatus in accordance with claim 11, wherein the number of conveying tracks on each part of the divided distributor conveyor is equal to the maximum number of conveying tracks of the ingoing conveyor and/or of the outgoing conveyor.

13. The apparatus in accordance with claim 1, wherein the distributor conveyors each have a length with respect to the conveying direction which is just sufficient for taking up a product of a stream of products conveyed after one another.

14. The apparatus in accordance with claim 1, wherein the distributor conveyors are each configured as band conveyors or belt conveyors.

15. The apparatus in accordance with claim 1, wherein the ingoing conveyor, the outgoing conveyor and the distributor conveyors have the same conveying width.

16. The apparatus in accordance with claim 1, wherein the ingoing conveyor, the distributor conveyors and the outgoing conveyor are arranged without mutual overlap following one another along the conveying direction.

17. The apparatus in accordance with claim 1, wherein the ingoing conveyor and/or the outgoing conveyor are configured for the line-wise conveying of the products in the conveying direction.

18. An apparatus for distributing a stream of products comprising
   an ingoing conveyor and an outgoing conveyor which are configured to convey the products along a conveying direction and which are arranged behind one another viewed in the conveying direction; and
   at least two distributor conveyors which are arranged behind one another viewed in the conveying direction between the ingoing conveyor and the outgoing conveyor and which are each configured to convey the products along the conveying direction,
   wherein the distributor conveyors are displaceable independently of one another transverse to the conveying direction,
   wherein only the distributor conveyor at the very front viewed in the conveying direction is divided into at least two parts disposed next to one another with respect to the conveying direction and drivable independently of one another,
   wherein each of the distributor conveyors is displaceable by at most one conveying track transverse to the conveying direction starting from a center position.

19. The apparatus in accordance with claim 18, wherein at most three distributor conveyors are arranged behind one another viewed in the conveying direction between the ingoing conveyor and the outgoing conveyor and which are each configured to convey the products along the conveying direction.

20. The apparatus in accordance with claim 18, wherein at least one of the distributor conveyors can be driven only in the conveying direction.

21. The apparatus in accordance with claim 18, wherein each of the distributor conveyors can be driven only in the conveying direction.

22. The apparatus in accordance with claim 18, wherein at least one further distributor conveyor is arranged between the ingoing conveyor and the outgoing conveyor and is displaceable independently of the other distributor conveyors transverse to the conveying direction.

23. The apparatus in accordance with claim 18, wherein exactly one further distributor conveyor is arranged between the ingoing conveyor and the outgoing conveyor and is displaceable independently of the other distributor conveyors transverse to the conveying direction.

24. The apparatus in accordance with claim 18, wherein the distributor conveyor at the very front viewed in the conveying direction is divided into exactly two parts disposed next to one another with respect to the conveying direction and drivable independently of one another.

25. The apparatus in accordance with claim 18, wherein each of the at least two parts of the divided distributor conveyor has a plurality of conveying tracks located next to one another for the parallel conveying of products.

26. The apparatus in accordance with claim 25, wherein the number of conveying tracks on each part of the divided distributor conveyor amounts to exactly half the maximum number of conveying tracks of the ingoing conveyor and/or of the outgoing conveyor.

27. The apparatus in accordance with claim 25, wherein at least one of the distributor conveyors is displaceable by at most one conveying track transverse to the conveying direction starting from a center position.

28. The apparatus in accordance with claim 18, wherein the distributor conveyors each have a plurality of conveying tracks located next to one another for the parallel conveying of groups of products or product portions.

29. The apparatus in accordance with claim 28, wherein the number of conveying tracks on each part of the divided distributor conveyor is equal to the maximum number of conveying tracks of the ingoing conveyor and/or of the outgoing conveyor.

30. The apparatus in accordance with claim 18, wherein the distributor conveyors each have a length with respect to the conveying direction which is just sufficient for taking up a product of a stream of products conveyed after one another.

31. The apparatus in accordance with claim 18, wherein the distributor conveyors are each configured as band conveyors or belt conveyors.

32. The apparatus in accordance with claim 18, wherein the ingoing conveyor, the outgoing conveyor and the distributor conveyors have the same conveying width.

33. The apparatus in accordance with claim 18, wherein the ingoing conveyor, the distributor conveyors and the outgoing conveyor are arranged without mutual overlap following one another along the conveying direction.

34. The apparatus in accordance with claim 18, wherein the ingoing conveyor and/or the outgoing conveyor are configured for the line-wise conveying of the products in the conveying direction.

* * * * *